United States Patent
Hao et al.

(10) Patent No.: US 12,520,291 B2
(45) Date of Patent: Jan. 6, 2026

(54) SYSTEMS AND METHODS FOR MANAGING TRANSMISSION INDICATION IN MULTICAST AND BROADCAST COMMUNICATIONS

(71) Applicant: ZTE Corporation, Guangdong (CN)

(72) Inventors: Peng Hao, Shenzhen (CN); Xing Liu, Shenzhen (CN); Jian Li, Shenzhen (CN); Xingguang Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 579 days.

(21) Appl. No.: 17/950,615

(22) Filed: Sep. 22, 2022

(65) Prior Publication Data
US 2023/0217424 A1 Jul. 6, 2023

Related U.S. Application Data

(63) Continuation of application No. PCT/CN2021/071073, filed on Jan. 11, 2021.

(51) Int. Cl.
*H04W 72/0453* (2023.01)
*H04W 72/30* (2023.01)

(52) U.S. Cl.
CPC ....... *H04W 72/0453* (2013.01); *H04W 72/30* (2023.01)

(58) Field of Classification Search
CPC . H04W 72/0453; H04W 72/30; H04W 72/23; H04L 5/0005; H04L 5/0044; H04L 5/0096
See application file for complete search history.

(56) References Cited

U.S. PATENT DOCUMENTS

| | | | |
|---|---|---|---|
| 2019/0215847 A1 | 7/2019 | Abdoli et al. | |
| 2019/0253230 A1 | 8/2019 | Loehr et al. | |
| 2020/0077432 A1 | 3/2020 | Xiong et al. | |
| 2020/0403763 A1* | 12/2020 | Takeda | H04L 5/001 |
| 2021/0250152 A1* | 8/2021 | Zhang | H04B 7/0408 |
| 2021/0298002 A1* | 9/2021 | Zhao | H04L 5/0044 |
| 2022/0046635 A1* | 2/2022 | Liou | H04B 7/0691 |
| 2022/0225360 A1* | 7/2022 | Yi | H04W 72/1268 |

FOREIGN PATENT DOCUMENTS

| | | |
|---|---|---|
| CN | 110121210 A | 8/2019 |
| CN | 111727630 A | 9/2020 |
| EP | 3 709 738 A1 | 9/2020 |

OTHER PUBLICATIONS

International Search Report and Written Opinion for PCT Appl. No. PCT/CN2021/071073, mailed Oct. 12, 2021 (8 pages).
Qualcomm Incorporated: "Remaining issues on BWP" 3GPP TSG RAN WG1 Meeting #93; R1-1807368; May 25, 2018; Busan, Korea (19 pages).
Extended European Search Report for EP Appl. No. 21916882.0, dated Feb. 14, 2024 (8 pages).

* cited by examiner

*Primary Examiner* — Kwang B Yao
*Assistant Examiner* — Patrick Yipao Pei
(74) *Attorney, Agent, or Firm* — Foley & Lardner LLP

(57) ABSTRACT

Systems and methods for wireless communications are disclosed herein. In some arrangements, a method includes switching by a network and a wireless communication device from communicating in a first frequency resource to communicating in a second frequency resource. In response to the switching, the network and the wireless communication device communicate using the second frequency resource.

20 Claims, 4 Drawing Sheets

SYSTEMS AND METHODS FOR MANAGING TRANSMISSION INDICATION IN MULTICAST AND BROADCAST COMMUNICATIONS

CROSS-REFERENCE TO RELATED APPLICATION

This application claims the benefit of priority under 35 U.S.C. § 120 as a continuation of PCT Patent Application No. PCT/CN2021/071073, filed on Jan. 11, 2021, the disclosure of which is incorporated herein by reference in its entirety.

TECHNICAL FIELD

The disclosure relates generally to wireless communications and, more particularly, to systems and methods for managing transmission indication in multicast and broadcast communications.

BACKGROUND

In New Radio (NR) wireless communication systems, a network can communicate with a plurality of User Equipment (UEs) via multicast or broadcast. In particular, a network can transmit downlink information such as but not limited to, Multicast and Broadcast Services (MBS) Physical Downlink Shared Channel (PDSCH), MBS Physical Downlink Control Channel (PDCCH), and so on.

SUMMARY

The example arrangements disclosed herein are directed to solving the issues relating to one or more of the problems presented in the prior art, as well as providing additional features that will become readily apparent by reference to the following detailed description when taken in conjunction with the accompany drawings. In accordance with various arrangements, example systems, methods, devices and computer program products are disclosed herein. It is understood, however, that these arrangements are presented by way of example and are not limiting, and it will be apparent to those of ordinary skill in the art who read the present disclosure that various modifications to the disclosed arrangements can be made while remaining within the scope of this disclosure.

In some arrangements, a wireless communication method includes switching, by a network, from communicating with a wireless communication device in a first frequency resource to communicating with the wireless communication device in a second frequency resource, and communicating, by the network with the wireless communication device, in the second frequency resource.

In some arrangements, a wireless communication method includes switching by a wireless communication device, from communicating with a network in a first frequency resource to communicating with the network in a second frequency resource, and communicating, by the wireless communication device with the network, in the second frequency resource.

The above and other aspects and their implementations are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example arrangements of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example arrangements and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1A:
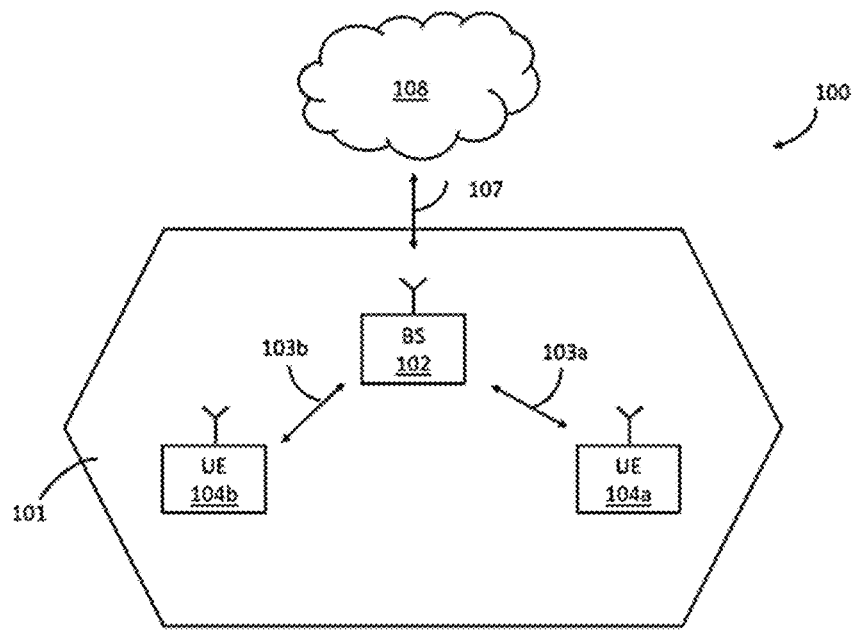
FIG. 1A is a diagram illustrating an example wireless communication network, according to various arrangements.

FIG. 1A shows an example wireless communication network 100. The wireless communication network 100 corresponds to a group communication within a cellular network. In the wireless communication network 100, a network side communication node or a base station (BS) can include one or more of a next Generation Node B (gNB), an E-utran Node B (also known as Evolved Node B, eNodeB or eNB), a pico station, a femto station, a Transmission/Reception Point (TRP), an Access Point (AP), or the like. A terminal side node or a user equipment (UE) can include a long range communication system (such as but not limited to, a mobile device, a smart phone, a Personal Digital Assistant (PDA), a tablet, a laptop computer) or a short range communication system (such as but not limited to, a wearable device, a vehicle with a vehicular communication system, or the like). As In FIG. 1A, a network side communication node is represented by a BS 102, and a terminal side communication node is represented by a UE 104a or 104b. In some arrangements, the BS 102 is sometimes referred to as a "wireless communication node," and the UE 104a/104b is sometimes referred to as a "wireless communication device."

As shown in FIG. 1A, the BS 102 can provide wireless communication services to the UEs 104a and 104b within a cell 101. The UE 104a can communicate with the BS 102 via a communication channel 103a. Similarly, the UE 104b can communicate with the BS 102 via a communication channel 103b. The communication channels (e.g., 103a and 103b) can be through interfaces such as but not limited to, an Uu interface which is also known as Universal Mobile Telecommunication System (UMTS) air interface. The BS 102 is connected to a Core Network (CN) 108 through an external interface 107, e.g., an Iu interface.

Figure 1B:
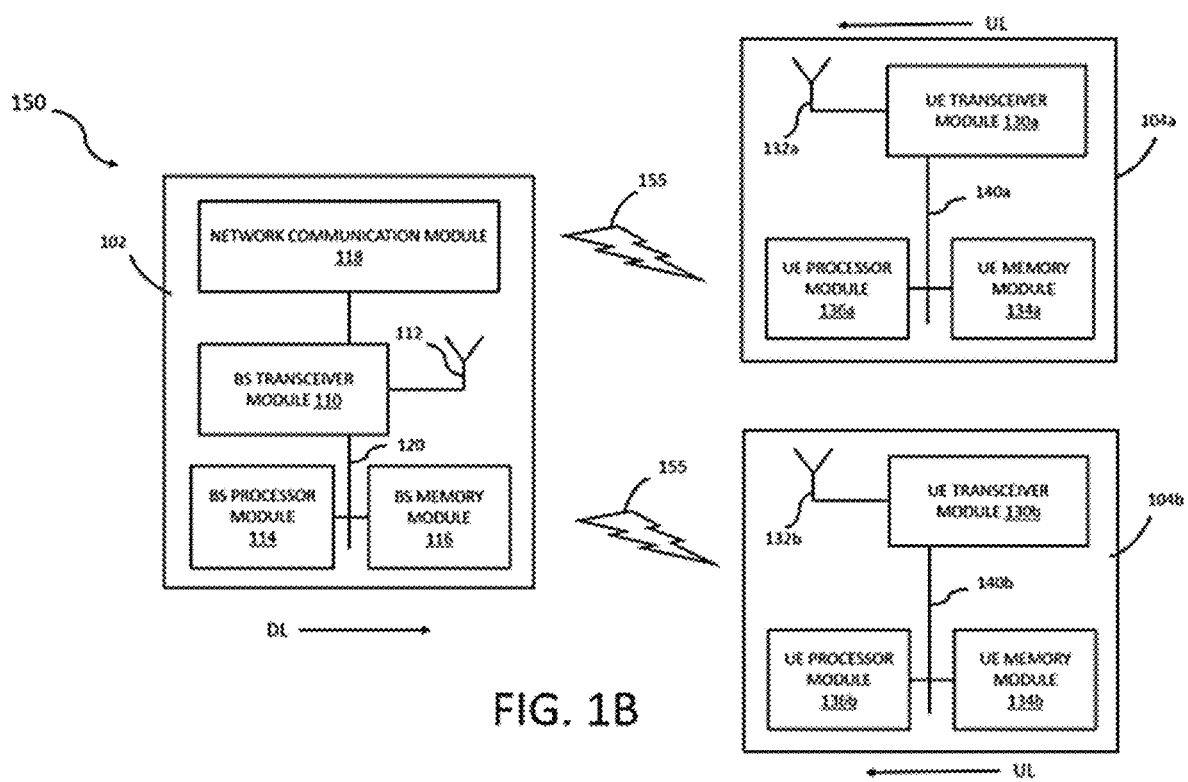
FIG. 1B is a diagram illustrating a block diagram of an example wireless communication system for transmitting and receiving downlink and uplink communication signals, according to various arrangements.

FIG. 1B illustrates a block diagram of an example wireless communication system 150 for transmitting and receiving downlink and uplink communication signals, in accordance with some arrangements of the present disclosure. Referring to FIGS. 1A and 1B, in the system 150, data symbols can be transmitted and received in a wireless communication environment such as the wireless communication network 100 of FIG. 1A.

The system 150 generally includes the BS 102 and UEs 104a and 104b. The BS 102 includes a BS transceiver module 110, a BS antenna 112, a BS memory module 116, a BS processor module 114, and a network communication module 118. The modules/components are coupled and interconnected with one another as needed via a data communication bus 120. The UE 104a includes a UE transceiver module 130a, a UE antenna 132a, a UE memory module 134a, and a UE processor module 136a. The modules/components are coupled and interconnected with one another as needed via a data communication bus 140a. Similarly, the UE 104b includes a UE transceiver module 130b, a UE antenna 132b, a UE memory module 134b, and a UE processor module 136b. The modules/components are coupled and interconnected with one another as needed via a data communication bus 140b. The BS 102 communicates with the UEs 104a and 104b via communication channels 155, which can be any wireless channel or other medium known in the art suitable for transmission of data as described herein.

The system 150 can further include any number of modules/elements other than the modules/elements shown in FIG. 1B. The various illustrative blocks, modules, elements, circuits, and processing logic described in connection with the arrangements disclosed herein can be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionalities. Whether such functionalities are implemented as hardware, firmware, or software depends upon the particular application and design constraints imposed on the overall system. Those familiar with the concepts described herein may implement such functionalities in a suitable manner for each particular application, but such implementation decisions should not be interpreted as limiting the scope of the present disclosure.

A wireless transmission from an antenna of each of the UEs 104a and 104b to an antenna of the BS 102 is known as an uplink transmission, and a wireless transmission from an antenna of the BS 102 to an antenna of each of the UEs 104a and 104b is known as a downlink transmission. In accordance with some arrangements, each of the UE transceiver modules 130a and 130b may be referred to herein as an uplink transceiver, or UE transceiver. The uplink transceiver can include a transmitter circuitry and receiver circuitry that are each coupled to the respective antenna 132a and 132b. A duplex switch may alternatively couple the uplink transmitter or receiver to the uplink antenna in time duplex fashion. Similarly, the BS transceiver module 110 may be herein referred to as a downlink transceiver, or BS transceiver. The downlink transceiver can include RF transmitter circuitry and receiver circuitry that are each coupled to the antenna 112. A downlink duplex switch may alternatively couple the downlink transmitter or receiver to the antenna 112 in time duplex fashion. The operations of the transceivers 110, 130a, and 130b are coordinated in time such that the uplink receiver is coupled to the antenna 132a and 132b for reception of transmissions over the wireless communication channels 155 at the same time that the downlink transmitter is coupled to the antenna 112. In some arrangements, the UEs 104a and 104b can use the UE transceivers 130a and 130b through the respective antennas 132a and 132b to communicate with the BS 102 via the wireless communication channels 155. The wireless communication channel 155 can be any wireless channel or other medium suitable for downlink (DL) and/or uplink (UL) transmission of data as described herein.

The UE transceiver 130a/130b and the BS transceiver 110 are configured to communicate via the wireless data communication channel 155, and cooperate with a suitably configured antenna arrangement that can support a particular wireless communication protocol and modulation scheme. In some arrangements, the UE transceiver 130a/130b and the BS transceiver 110 are configured to support industry standards such as the Long Term Evolution (LTE) and emerging 5G standards, or the like. It is understood, however, that the present disclosure is not necessarily limited in application to a particular standard and associated protocols. Rather, the UE transceiver 130a/130b and the BS transceiver 110 may be configured to support alternate, or additional, wireless data communication protocols, including future standards or variations thereof.

The processor modules 136a and 136b and 114 may be each implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, methods or algorithms described in connection with the arrangements disclosed herein may be embodied directly in hardware, in firmware, in a software module executed by processor modules 114, 136a, and 136b, respectively, or in any practical combination thereof. The memory modules 116, 134a, 134b can be realized as RAM memory, flash memory, ROM memory, EPROM memory, EEPROM memory, registers, a hard disk, a removable disk, a CD-ROM, or another suitable form of storage medium. In this regard, the memory modules 116, 134a, and 134b may be coupled to the processor modules 114, 136a, and 136b, respectively, such that the processors modules 114, 136a, and 136b can read information from, and write information to, the memory modules 116, 134a, and 134b, respectively. The memory modules 116, 134a, and 134b may also be integrated into their respective processor modules 114, 136a, and 136b. In some arrangements, the memory modules 116, 134a, and 134b may each include a cache memory for storing temporary variables or other intermediate information during execution of instructions to be executed by processor modules 114, 136a, and 136b, respectively. Memory modules 116, 134a, and 134b may also each include non-volatile memory for storing instructions to be executed by the processor modules 114, 136a, and 136b, respectively.

The network interface 118 generally represents the hardware, software, firmware, processing logic, and/or other components of the BS 102 that enable bi-directional communication between BS transceiver 110 and other network components and communication nodes configured to communication with the BS 102. For example, the network interface 118 may be configured to support internet or WiMAX traffic. In a typical deployment, without limitation, the network interface 118 provides an 802.3 Ethernet interface such that BS transceiver 110 can communicate with a conventional Ethernet based computer network. In this manner, the network interface 118 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 118 can allow the BS 102 to communicate with other BSs or core network over a wired or wireless connection.

The BS 102 can communicate with a plurality of UEs (including the UEs 104a and 104b) using multicast or broadcast, collectively referred to as MBS. The plurality of UEs can each receive MBS channel (e.g., MBS PDSCH, MBS PDCCH, and so on) via multicast and/or broadcast. In order to receive the MBS channel, the plurality of UEs have a common understanding on the configurations of the MBS channel, including but not limited to, frequency resource range for resource allocation, scramble identifier (ID), and so on.

In some implementations of the wireless communication network 100 and the wireless communication system 150, for multicast of Radio Resource Control (RRC)-CONNECTED UEs, a common frequency resource for group-common PDCCH/PDSCH is confined within the frequency resource of a dedicated unicast Bandwidth Part (BWP) to support simultaneous reception of unicast and multicast in the same slot. Two options can be used for the common frequency resource for group-common PDCCH/PDSCH. In a first option, the common frequency resource is defined as an MB S-specific BWP, which is associated with the dedicated unicast BWP and using the same numerology (e.g., Subcarrier Spacing (SCS) and Cyclic Prefix (CP)). Accordingly, BWP switching is needed between the multicast reception in the MBS-specific BWP and unicast reception in its associated dedicated BWP.

In a second option, the common frequency resource is defined as an "MBS frequency region" with a number of contiguous PRBs, which is configured within the dedicated unicast BWP. The starting PRB and the length of PRBs of the MBS frequency region are indicated using a suitable mechanism. In the second option, a MBS BWP is used for MBS transmission, which is associated to unicast BWP. MBS BWP and unicast BWP can be used for the MBS PDSCH and unicast PDSCH transmission, which need simultaneous activation of two BWPs. The arrangements disclosed herein relate to managing the operations of two active BWPs.

As used herein, BWP refers to a portion of contiguous frequency resource in a cell. In other words, a BWP is a continuous range of frequencies that can be used for communications between a BS and UEs. Some transmission parameters and channel configurations are BWP-specific. Different UEs can have different BWP configurations. In one implementation, at most one of multiple configured BWPs can be activated due to lack of time, although at most four BWPs can be configured for a UE. In other words, for a UE, at most one active DL BWP and at most one active UL BWP at a given time can be activated for a given serving cell.

Figure 2:
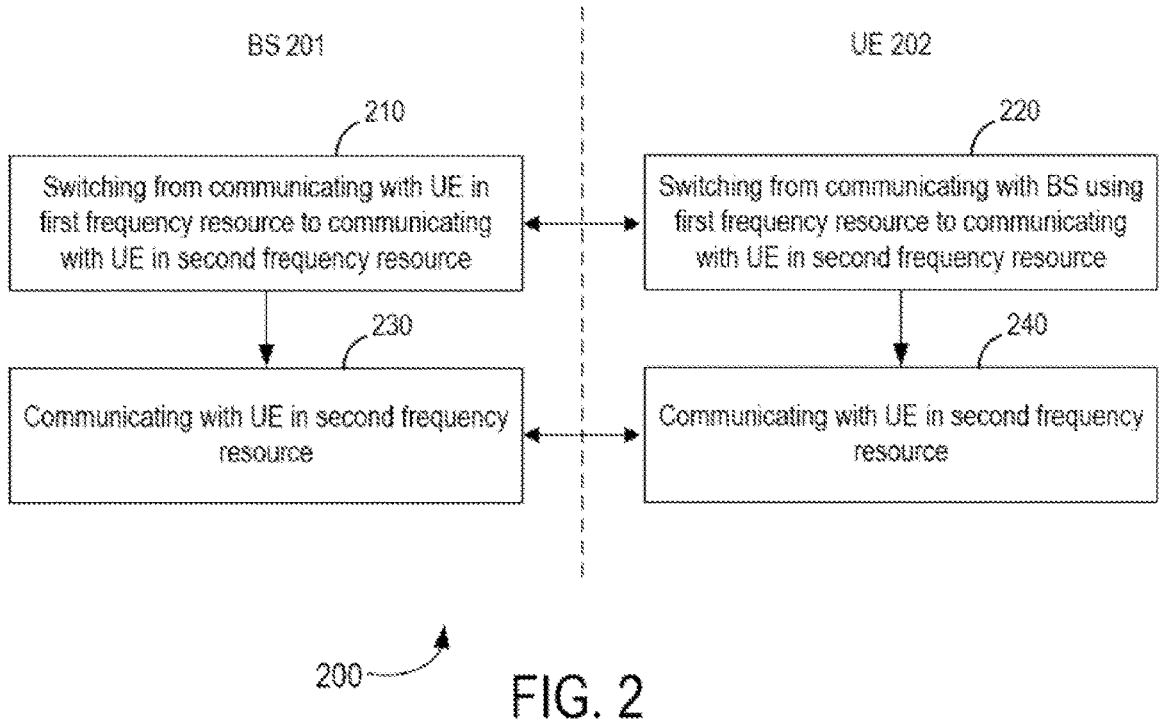
FIG. 2 is a flowchart diagram illustrating a method for performing frequency resource switching, according to various arrangements.

FIG. 2 is a flowchart diagram illustrating a method 200 for performing frequency resource switching, according to various arrangements. Referring to FIGS. 1A-2, the method 200 can be performed by a BS 201 and a UE 202. An example of the BS 201 is the BS 102. Examples of the UE 202 include the UEs 104a and 104b. As shown, blocks 210 and 230 are performed by the BS 201, which represents the network (having one or more BSs such as the BS 201) to which the UE 202 is connected. The UE 202 performs blocks 220 and 240.

The BS 201 and the UE 202 can perform switching from communicating in a first frequency resource to communicating in a second frequency resource. At 210, the network (e.g., the BS 201) switches from communicating with the UE 202 in a first frequency resource to communicating with the UE 202 in a second frequency resource. At 220, the UE 202 switches from communicating with the network (e.g., the BS 201) in the first frequency resource to communicating with the BS 201 in the second frequency resource. The first frequency resource is a first BWP, which is the currently active BWP. The BS 201 and the UE 202 are communicating (e.g., sending and receiving data) using the currently active BWP or a portion thereof prior to switching at 210 and 220.

At 230, in response to the switching, the network (e.g., the BS 201) communicates with the UE 202 in the second frequency resource. At 240, in response to the switching, the UE 202 communicates with the network (e.g., the BS 201) in the second frequency resource.

In some arrangements, dynamic BWP switching is supported by Downlink Control Information (DCI) indication or timer. In other words, the UE can perform dynamic BWP switching based on DCI indication that the UE received from the BS, or based on a timer. In some examples in which only one BWP (one frequency resource) among multiple (e.g., at most four) configured BWPs can be activated at any given time. For a DCI-based BWP switching method in the examples in which one BWP among multiple configured BWPs is activated, a UE can receive a DCI having a BWP indicator field that indicates the BWP for the transmission of a scheduled PDSCH. In response to the UE determining that the indicated BWP in the DCI is different from the currently active BWP, BWP switching is triggered, such that BWP is switched from the currently active BWP to the indicated BWP. For a timer-based BWP switching method in the examples in which one BWP among multiple configured BWPs is activated, the current active BWP is switched to a default BWP in response to the timer expiring.

In some arrangements, each codepoint in BWP indicator field is associated with or mapped to one BWP. For example, a two-bit BWP indicator field can support a total of four codepoints (e.g., 00, 01, 10, 11). In some arrangements, in which one BWP is activated at a given time, each codepoint is associated with or mapped to one BWP.

In some arrangements, in which more than one BWP is activated at a given time, each of one or more of the codepoints supported by the BWP indicator field is associated with or mapped to more than one BWP. For example, for a given UE, two BWPs can be activated at a given time, each one or more of the codepoints supported by the BWP indicator field is associated with or mapped to two BWPs. The UE can receive, from a BS, a DCI having a two-bit BWP indicator field that supports four codepoints: 00, 01, 10, and 11. The BS configures 4 BWP (BWP1, BWP2, BWP3, and BPW4) for the UE. As an example, codepoint 00 is associated with or mapped to BWP1 and BWP2, and in response to receiving a DCI with codepoint 00 in the BWP indicator field, the UE activates or switches to two BWPs, BWP1 and BWP2, at the same time. Codepoint 01 is associated with or mapped to BWP2, and in response to receiving a DCI with codepoint 01 in the BWP indicator field, the UE activates or switches to one BWP, BWP2. Codepoint 10 is associated with or mapped to BWP3, and in response to receiving a DCI with codepoint 01 in the BWP indicator field, the UE activates or switches to one BWP, BWP3. Codepoint 11 is associated with or mapped to BWP4, and in response to receiving a DCI with codepoint 01 in the BWP indicator field, the UE activates or switches to one BWP, BWP4.

Whether several BWPs can be activated at the same time will be determined and configured by the BS according to the UE's capability report and the corresponding conditions (if any). For example, if UE reports that the UE supports simultaneously activation of at most N BWPs, then the BS can configure simultaneously activation of BWPs satisfying certain conditions. For example, the N BWPs share the same numerology, and N-1 of the N BWPs are associated one of the N BWPs (e.g., the largest BWP of the N BWPs includes, encompasses, or covers the rest of the N BWPs, and the rest of the N BWPs are within the boundaries of the largest BWP). Meanwhile, the BS can also configure or indicate if BWP switching delay is needed for the switching between two BWPs according to UE's capability report and the corresponding conditions (if any).

As stated above, a plurality of N BWPs that can be activated simultaneously for the UE 202. In some examples, N-1 of the N BWPs are associated with one of the N BWPs. Dynamic BWP switching can be done via DCI indication in this case. In the example in which PDCCH in an active BWP (e.g., the first BWP) indicates a codepoint which is associated with a BWP (e.g., a second BWP) other than currently active BWP, BWP switching occurs. At this time, the PDSCH scheduled by the PDCCH will be transmitted in a newly activated BWP (e.g., the second BWP). In the example in which one codepoint is associated with two or more BWPs, identifying or selecting one of the two or more BWPs that will be used for the transmission of the PDSCH scheduled by the PDCCH is needed.

In those examples, when BWP switching (referred to generally as frequency resource switching) is performed via a PDCCH (referred to generally as first downlink information) from currently active BWP(s) (referred to generally as the first frequency resource) to the N BWPs, the BWP for the transmission of the PDSCH (referred to generally as second downlink information or downlink information scheduled by the first downlink information) scheduled by the PDCCH can be determined using methods 300 and 400.

Figure 3:
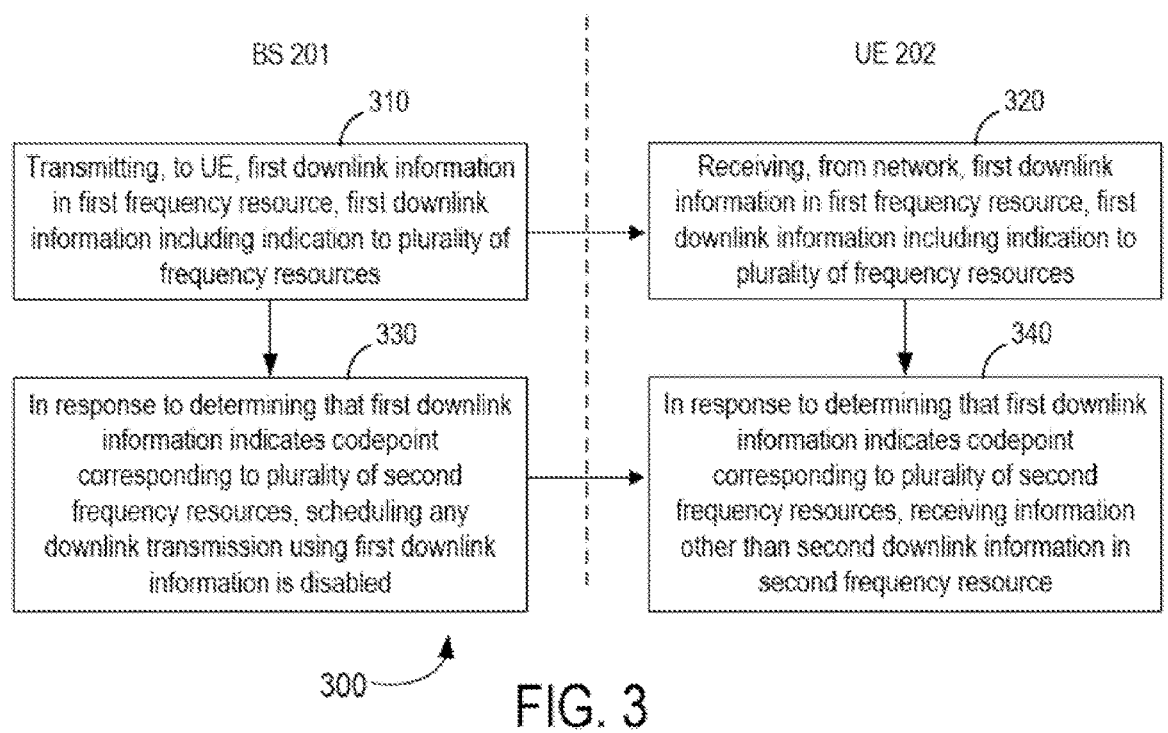
FIG. 3 is a flowchart diagram illustrating a method for performing frequency resource switching, according to various arrangements.

FIG. 3 is a flowchart diagram illustrating a method 300 for performing frequency resource switching, according to various arrangements. Referring to FIGS. 1A-3 the method 300 can be performed by the BS 201 and the UE 202. As shown, blocks 310 and 330 are performed by the BS 201, which represents the network (having one or more BSs such as the BS 201) to which the UE 202 is connected. The UE 202 performs blocks 320 and 340. The method 300 is a particular implementation of the method 200. For example, block 310 is a particular implementation of block 210, block 320 is a particular implementation of block 220, block 330 is a particular implementation of block 230, and block 340 is a particular implementation of block 240.

At 310, the network (e.g., the BS 201) transmits first downlink information in the first frequency resource, where the first downlink information includes indication to a plurality of frequency resources. At 320, the UE 202 receives the first downlink information in the first frequency resource, the first downlink information includes the indication to the plurality of frequency resources. In some examples, the first downlink information includes a PDCCH. The indication includes a DCI. The first frequency source is a first BWP. The plurality of frequency sources correspond to a plurality of N BWPs. The first BWP is different from each of the N BWPs in some examples, though a portion of the first BWP may overlap with a portion of one or more of the N BWPs. In other examples, the first BWP is one of the N BWPs. The second frequency resource (e.g., a second BWP) is at least one of the plurality of frequency resources (e.g., at least one of the N BWPs).

At 330, in response to determining that the first downlink information indicates a codepoint corresponding to the plurality of frequency resources, the network (e.g., the BS 201) disables scheduling any downlink transmission (e.g., PDSCH) using the first downlink information. At 340, in response to determining that the first downlink information indicates the codepoint corresponding to the plurality of frequency resources, the UE 202 determines that scheduling any downlink transmission using the first downlink information is disabled.

Thus, in the method 300, the network and the UE 202 have the common understanding that the first downlink information (e.g., the PDCCH) does not schedule any second downlink information (e.g., any PDSCH) when the first downlink information indicates the codepoint which is associated with N BWPs.

Figure 4:
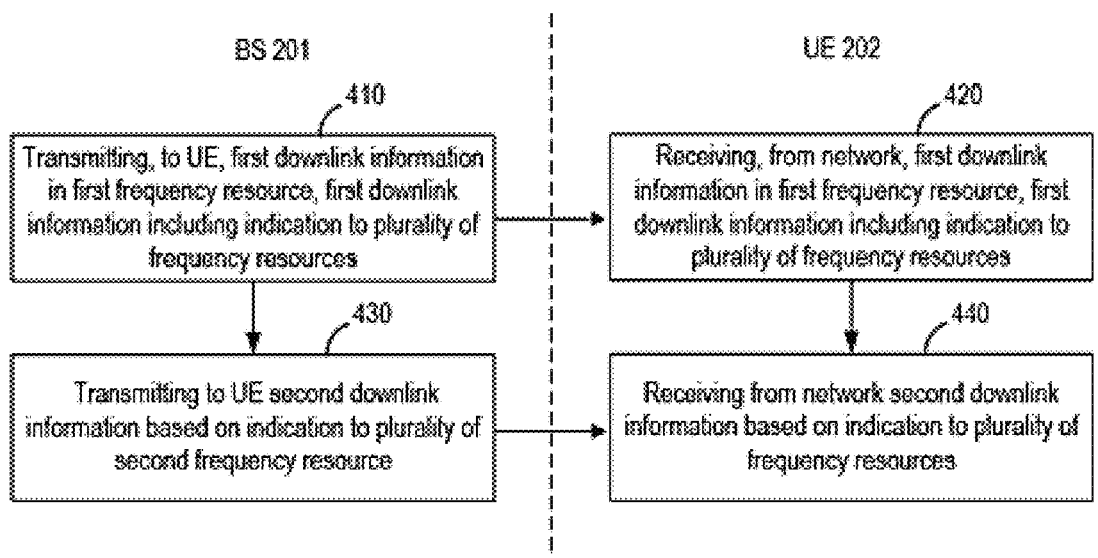
FIG. 4 is a flowchart diagram illustrating a method for performing frequency resource switching, according to various arrangements.

FIG. 4 is a flowchart diagram illustrating a method 400 for performing frequency resource switching, according to various arrangements. Referring to FIGS. 1A-4 the method 400 can be performed by the BS 201 and the UE 202. As shown, blocks 410 and 430 are performed by the BS 201, which represents the network (having one or more BSs such as the BS 201) to which the UE 202 is connected. The UE 202 performs blocks 420 and 440. The method 400 is a particular implementation of the method 200. For example, block 410 is a particular implementation of block 210, block 420 is a particular implementation of block 220, block 430 is a particular implementation of block 230, and block 440 is a particular implementation of block 240.

At 410, the network (e.g., the BS 201) transmits first downlink information in the first frequency resource, where the first downlink information includes indication to a plurality of frequency resources. At 420, the UE 202 receives the first downlink information in the first frequency resource, the first downlink information includes the indication to the plurality of frequency resources. In some examples, the first downlink information includes a PDCCH. The indication includes a DCI. The first frequency source is a first BWP. The plurality of frequency sources correspond to a plurality of N BWPs. The first BWP is different from each of the N BWPs in some examples, though a portion of the first BWP may overlap with a portion of one or more of the N BWPs. In other examples, the first BWP is one of the N BWPs. The second frequency resource (e.g., a second BWP) is at least one of the plurality of frequency resources (e.g., at least one of the N BWPs).

At 430, the network (e.g., the BS 201) transmits to the UE 202 second downlink information (e.g., PDSCH) based on the indication to the plurality of frequency resources. At 440, the UE 202 receives from the network the second downlink information based on the indication to the plurality of frequency resources. The second downlink information (e.g., PDSCH) can be scheduled by the first downlink information (e.g., PDCCH).

In some example, the second frequency resource is at least one default frequency resource of the plurality of frequency resources. In other words, the second frequency resource is at least one default or predefined BWP of the N BWPs. In this manner, the UE 202 may not need the BS 201 to indicate which one of the N BWPs is used for the second downlink information.

In some examples, switching BWPs includes indicating, by the network (e.g., the BS 201) to the UE 202, the second frequency resource of the plurality of frequency resources via signaling (e.g., RRC signaling), and the second downlink information is transmitted to the UE in the second frequency resource indicated via the signaling. On the UE-side, switching BWPs includes receiving, by the UE 202 from the network, the indication of the second frequency resource of the plurality of frequency resources via the signaling, and the second downlink information is received from the network in the second frequency resource indicated via the signaling.

In particular, the BS 201 can use signaling (e.g., RRC signaling) to implicitly or explicitly indicate at least one BWP of the N BWPs that is used for the PDSCH transmission. In the example in which the BS 201 explicitly indicates the at least one BWP, the BS 201 can transmit signaling that includes an index number, BWP name, or another suitable identifier of each of the at least one BWP in which the PDSCH transmission is to be transmitted. The UE 202, upon receiving such signaling, can directly identify the at least one BWP in which the PDSCH transmission is to be transmitted.

In the example in which the BS 201 implicitly indicates the at least one BWP, the BS 201 does not transmit any direct indication of the at least one BWP in which the PDSCH transmission is to be transmitted. Instead, for example, the first BWP in which the PDCCH is transmitted is associated with the at least one second BWP via certain predefined association or mapping, the UE 202 and the network share the understanding that the PDSCH scheduled by the PDCCH is to be communicated to the UE 202 in the at least one second BWP associated with or mapped to the first BWP.

In some examples, the bandwidth of the selected at least one second frequency resource of the plurality of frequency resources is closest to a bandwidth of the first frequency resource (in which the activation DCI is sent). In some examples, the bandwidth of the selected at least one second frequency resource is less than the bandwidth of the first frequency resource (in which the activation DCI is sent).

Figure 5:
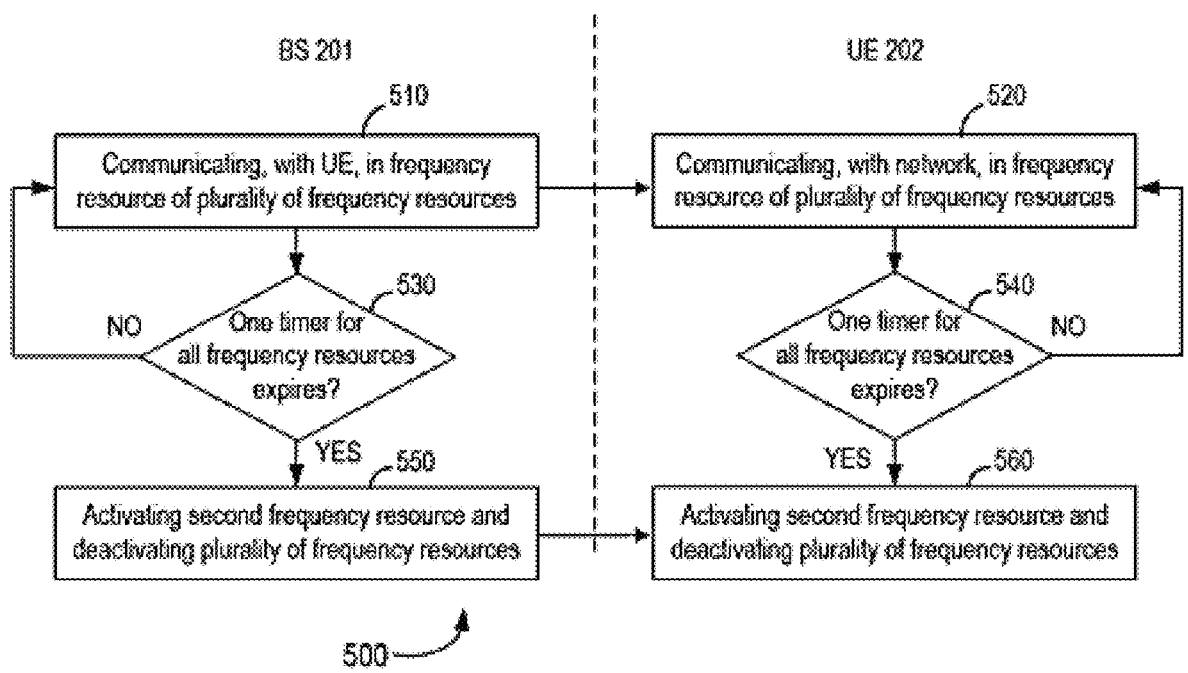
FIG. 5 is a flowchart diagram illustrating a method for performing frequency resource switching, according to various arrangements.
Figure 6:
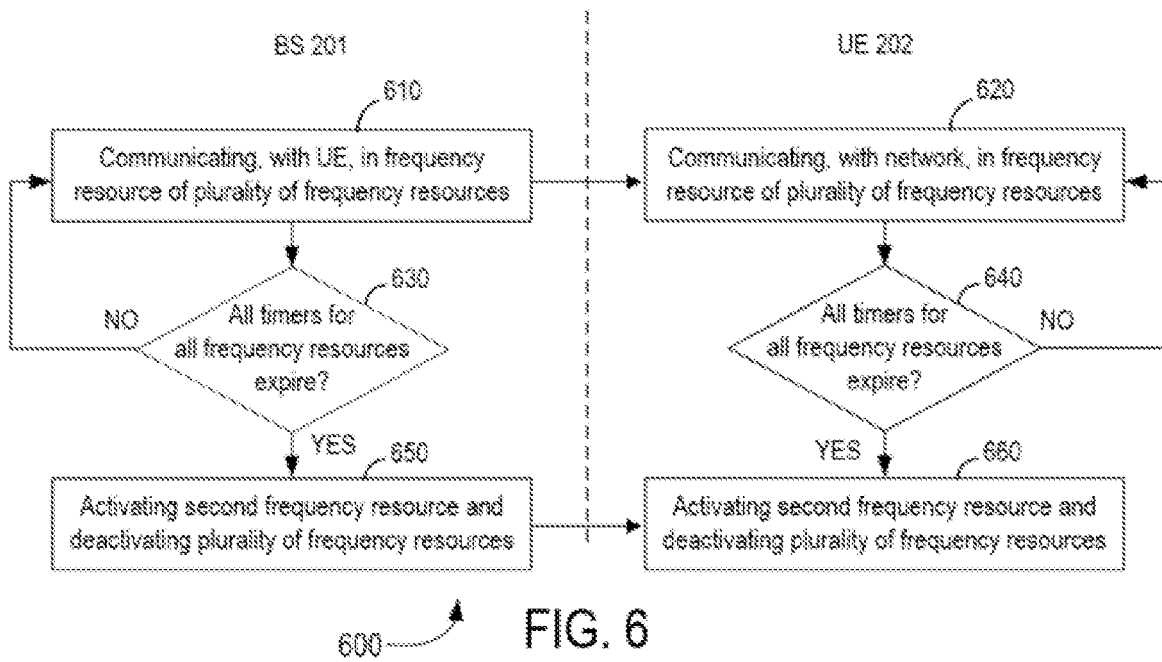
FIG. 6 is a flowchart diagram illustrating a method for performing frequency resource switching, according to various arrangements.

As stated above, a plurality of N BWPs that can be activated simultaneously for the UE 202. In some examples, N−1 of the N BWPs are associated with one of the N BWPs. Dynamic BWP switching can also be done via one or more timers. FIG. 5 relates to a dynamic BWP switching method using one timer for the N BWPs. FIG. 6 relates to a dynamic BWP switching method using one timer for each of the N BWPs.

FIG. 5 is a flowchart diagram illustrating a method 500 for performing frequency resource switching using one timer for multiple frequency resources that can be activated simultaneously, according to various arrangements. Referring to FIGS. 1A-5 the method 500 can be performed by the BS 201 and the UE 202. As shown, blocks 510, 530, and 550 are performed by the BS 201, which represents the network (having one or more BSs such as the BS 201) to which the UE 202 is connected. The UE 202 performs blocks 520, 540, and 560. The method 500 is a particular implementation of the method 200. For example, blocks 510, 530, and 550 are a particular implementation of block 210, and blocks 520, 540, and 560 are a particular implementation of block 220. In this case, the frequency resource of the method 200 refers to the N simultaneously, currently active BWPs.

At 510 and 520, the BS 201 and the UE 202 are communicating with one another in a frequency resource (e.g., one or more BWPs) of the plurality of frequency resources (e.g., the N BWPs). At 510 and 520, any suitable information or data can be communicated. The N BWPs are associated with a same codepoint, or some of the N BWPs are associated with one of the N BWPs.

At 530 and 540, the BS 201 and the UE 202, respectively, can determine whether one timer for all of the frequency resources has expired. That is, only one timer is implemented for the N BWPs that are associated with one codepoint, or for the N BWPs for which some of the N BWPs are associated with one of the N BWPs. In response to determining that the one timer for all of the frequency resources has not expired (530:NO; 540:NO), the method 500 returns to 510 and 520. In particular, in response to the BS 201 transmitting or receiving any information or data in any of the plurality of frequency resources, the timer resets. Similarly, in response to the UE 202 transmitting or receiving any information or data in any of the plurality of frequency resources, the timer resets.

On the other hand, in response to determining that the timer has expired (530:NO; 540:NO), at 550 and 560, respectively, the BS 201 and the UE 202 activates the second frequency resource for subsequent communication. The second frequency can be a predefined or default BWP. The plurality of frequency resources activated at 510 and 520 are deactivated at 550 and 560.

FIG. 6 is a flowchart diagram illustrating a method 600 for performing frequency resource switching using one timer for each of the multiple frequency resources that can be activated simultaneously, according to various arrangements. Referring to FIGS. 1A-6 the method 600 can be performed by the BS 201 and the UE 202. As shown, blocks 610, 630, and 650 are performed by the BS 201, which represents the network (having one or more BSs such as the BS 201) to which the UE 202 is connected. The UE 202 performs blocks 620, 640, and 660. The method 600 is a particular implementation of the method 200. For example, blocks 610, 630, and 650 are a particular implementation of block 210, and blocks 620, 640, and 660 are a particular implementation of block 220. In this case, the frequency resource of the method 200 refers to the N simultaneously, currently active BWPs.

At 610 and 620, the BS 201 and the UE 202 are communicating with one another in a frequency resource (e.g., one or more BWPs) of the plurality of frequency resources (e.g., the N BWPs). At 610 and 620, any suitable information or data can be communicated. The N BWPs are associated with a same codepoint, or some of the N BWPs are associated with one of the N BWPs.

At 630 and 640, the BS 201 and the UE 202, respectively, can determine whether all timers for all of the frequency resources have expired. That is, one timer is implemented for each of the N BWPs that are associated with one codepoint, or for the N BWPs for which some of the N BWPs are associated with one of the N BWPs. In response to determining that all timers for all of the frequency resources have not expired (630:NO; 640:NO), the method 600 returns to 610 and 620. In particular, in response to the BS 201 transmitting or receiving any information or data in any one of the plurality of frequency resources, the timer for that frequency resource resets. Similarly, in response to the UE 202 transmitting or receiving any information or data in any one of the plurality of frequency resources, the timer for that frequency resource resets.

On the other hand, in response to determining that all timers have expired (630:NO; 640:NO), at 650 and 660, respectively, the BS 201 and the UE 202 activates the second frequency resource for subsequent communication. The second frequency can be a predefined or default BWP. The plurality of frequency resources activated at 610 and 620 are deactivated at 550 and 560.

Figure 7:
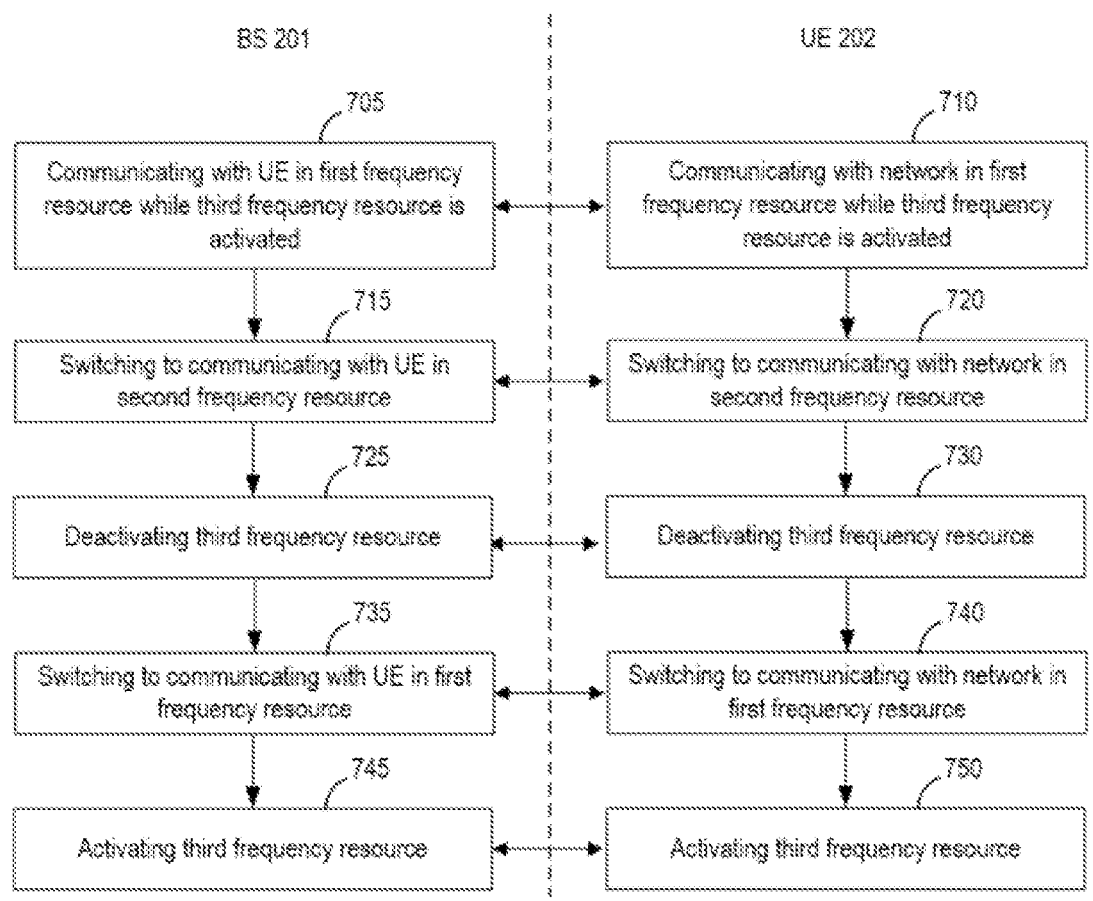
FIG. 7 is a flowchart diagram illustrating a method for performing frequency resource switching, according to various arrangements.

In the examples in which two or more BWPs are activated, each codepoint in the BWP indicator field is associated with one BWP (e.g., one frequency resource), although two or more BWPs (frequency resources) can be activated simultaneously for the UE 202. For example, the BS 201 configures three BWPs for the UE. A first BWP and a third BWP are capable of being activated simultaneously, and a second cannot be activated when any of the first BWP or the third BWP is activated. In response to switching from the first BWP (or the third BWP) to the second BWP, the third BWP (or the first BWP) is automatically deactivated. In addition, in response to switching from the second BWP back to the first BWP (or third BWP), the third BWP (or the first BWP) is automatically activated in the scenario in which if the previous deactivation of the third BWP (or the first BWP) is due to witching from the first BWP (or the third BWP) to the second BWP. FIG. 7 illustrates this concept.

FIG. 7 is a flowchart diagram illustrating a method 700 for performing frequency resource switching, according to various arrangements. Referring to FIGS. 1A-7 the method 700 can be performed by the BS 201 and the UE 202. As shown, blocks 705, 715, 725, 735, and 745 are performed by the BS 201, which represents the network (having one or more BSs such as the BS 201) to which the UE 202 is connected. The UE 202 performs blocks 710, 720, 730, 740, and 750.

At 705 and 710, the BS 201 and the UE 202 are communicating with one another in a first frequency resource (e.g., first BWP) while a third frequency resource (e.g., third BWP) is activated. At 705 and 710, any suitable information or data can be communicated. The one BWP is associated with one codepoint in the BWP indicator field of the DCI transmitted by the BS 201. The first and third frequency resources can be activated at the same time. Neither of the first frequency resource nor the third frequency resource can be activated simultaneously with the second frequency resource due to UE capabilities, BS configurations, network conditions, or another factor.

At 715 and 720, the BS 201 and the UE 202 respectively switches to communicating with each other in a second frequency resource from communicating with each other in the first frequency resource. The switching methods can be any of those disclosed herein. For example, the BS 201 can transmit to the UE 202 the first downlink information (e.g., PDCCH) in the first frequency resource, where the first downlink information includes an indication (e.g., DCI, particularly, a codepoint in the BWP indicator of the DCI) to the second frequency resource.

At 725 and 730, the BS 201 and the UE 202 deactivates the third frequency resource, respectively, given that the third frequency resource cannot be activated with the second frequency resource simultaneously. Block 725 is automatically performed in response to block 715, and block 730 is automatically performed in response to block 720.

At 735 and 740, the BS 201 and the UE 202 respectively switches back to communicating with each other in the first frequency resource. In response, at 745 and 750, the BS 201 and the UE 202 activate the third frequency resource, respectively. Block 745 is automatically performed in response to block 735 in response to determining that the only reason for which the third frequency resource is deactivated in the first place (e.g., at 725) is due to switching to the second frequency resource (e.g., due to incompatibility with the second frequency resource and no other reason). Block 750 is automatically performed in response to block 740 in response to determining that the only reason for which the third frequency resource is deactivated in the first place (e.g., at 730) is due to switching to the second frequency resource (e.g., due to incompatibility with the second frequency resource and no other reason).

On the other hand, in response to determining that the third frequency resource is deactivated due to another reason (e.g., network conditions), the BS 201 can reactivate the third frequency resource by sending signaling (e.g., RRC signaling) to the UE 202.

Various implementations described herein related to the BS 201 and the UE 202 communicating in a frequency resource (e.g., a BWP). Communicating in a given frequency resource refers to communicating (e.g., transmitting or receiving) information or data using at least a portion but not all of the frequency resource in some examples, and using all of the frequency resource in other examples.

The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various arrangements of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one arrangement can be combined with one or more features of another arrangement described herein. Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according arrangements of the present solution.

Additionally, memory or other storage, as well as communication components, may be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed:

1. A wireless communication method, comprising:
switching, by a network, from communicating with a wireless communication device in a first frequency resource to communicating with the wireless communication device in a second frequency resource, comprising transmitting, by the network to the wireless communication device, first downlink information in the first frequency resource, the first downlink information comprises an indication to a plurality of frequency resources to be activated at a same time, wherein the first downlink information indicates a codepoint corresponding to the plurality of frequency resources to be activated at the same time, the plurality of frequency resources comprises the second frequency resource, wherein the codepoint is one of a plurality of codepoints, each of the plurality of codepoints is used to indicate and mapped to a different combination of frequency resources to be activated at the same time; and
communicating, by the network with the wireless communication device, in the second frequency resource.

2. The method of claim 1, wherein
scheduling any downlink transmission using the first downlink information is disabled.
3. The method of claim 1, wherein
communicating in the second frequency resource comprises transmitting, by the network to the wireless communication device, second downlink information based on the indication to the plurality of frequency resources.
4. The method of claim 3, wherein
the first downlink information comprises a Physical Downlink Control Channel (PDCCH);
the first frequency resource comprises at least one first Bandwidth Part (BWP);
the plurality of frequency resources comprises a plurality of second BWPs, the second frequency resource comprises at least one of the plurality of second BWPs; and
the second downlink information comprises a Physical Downlink Shared Channel (PDSCH).
5. The method of claim 3, wherein the second frequency resource is a default frequency resource of the plurality of frequency resources.
6. The method of claim 3, wherein
switching from communicating with the wireless communication device in the first frequency resource to communicating with the wireless communication device in the second frequency resource further comprises indicating, by the network to the wireless communication device, the second frequency resource of the plurality of frequency resources via signaling; and
transmitting the second downlink information based on the indication to the plurality of frequency resources comprises transmitting the second downlink information in the second frequency resource.
7. The method of claim 3, wherein one of:
a bandwidth of the selected second frequency resource is closest to a bandwidth of the first frequency resource; or
the bandwidth of the selected second frequency resource is less than the bandwidth of the first frequency resource.
8. The method of claim 3, wherein
the indication comprises a codepoint in a BWP indicator field of the PDCCH; and
the codepoint is used to indicate two or more of the plurality of frequency resources.
9. The method of claim 1, wherein
the first frequency resource comprises a plurality of frequency resources; and
switching from communicating with the wireless communication device in the first frequency resource to communicating with the wireless communication device in the second frequency resource is performed based on one or more timers associated with the plurality of frequency resources.
10. The method of claim 9, wherein
the one or more timers comprises one timer associated with all of the plurality of frequency resources; and
switching from communicating with the wireless communication device in the first frequency resource to communicating with the wireless communication device in the second frequency resource based on the one or more timers comprises:
in response to determining that the one timer has expired, activating the second frequency resource; and
in response to transmitting in one of the plurality of frequency resources, resetting the one timer.

11. The method of claim 9, wherein
the one or more timers comprises a plurality of timers, each of the plurality of timers is associated with one of the plurality of frequency resources; and
switching from communicating with the wireless communication device in the first frequency resource to communicating with the wireless communication device in the second frequency resource based on the one or more timers comprises:
in response to determining that one of the plurality of timers have expired, deactivating one of the plurality of frequency resources corresponding to the one of the plurality of timers; and
in response to determining that all of the plurality of timers have expired, activating the second frequency resource.
12. The method of claim 1, wherein
switching from communicating with the wireless communication device in the first frequency resource to communicating with the wireless communication device in the second frequency resource comprises transmitting, by the network to the wireless communication device, first downlink information in the first frequency resource, the first downlink information comprises an indication to the second frequency resource; and
prior to the switching, the first frequency resource and a third frequency resource are activated.
13. The method of claim 12, wherein in response to switching the first frequency resource to the second frequency resource, deactivating the third frequency resource.
14. The method of claim 13, further comprising:
switching from the second frequency resource back to the first frequency resource after switching the first frequency resource to the second frequency resource and after deactivating the third frequency resource; and
automatically activating the third frequency resource in response to determining that the first frequency resource is activated and that the third frequency resource is deactivated due to activation of the second frequency.
15. A wireless communication method, comprising:
switching, by a wireless communication device, from communicating with a network in a first frequency resource to communicating with the network in a second frequency resource, comprising receiving, by the wireless communication device from network, first downlink information in the first frequency resource, the first downlink information comprises an indication to a plurality of frequency resources to be activated at a same time, wherein the first downlink information indicates a codepoint corresponding to the plurality of frequency resources to be activated at the same time, the plurality of frequency resources comprises the second frequency resource, wherein the codepoint is one of a plurality of codepoints, each of the plurality of codepoints is used to indicate and mapped to a different combination of frequency resources to be activated at the same time; and
communicating, by the wireless communication device with the network, in the second frequency resource.
16. The method of claim 15, wherein
determining that scheduling any downlink transmission using the first downlink information is disabled.
17. The method of claim 15, wherein
communicating in the second frequency resource comprises receiving, by the wireless communication device from the network, second downlink information based on the indication to the plurality of frequency resources.

18. The method of claim 17, wherein the second frequency resource is a default frequency resource of the plurality of frequency resources.

19. A network, comprising:
at least one processor configured to:
switch from communicating with a wireless communication device in a first frequency resource to communicating with the wireless communication device in a second frequency resource, comprising transmitting, by the network to the wireless communication device, first downlink information in the first frequency resource, the first downlink information comprises an indication to a plurality of frequency resources to be activated at a same time, wherein the first downlink information indicates a codepoint corresponding to the plurality of frequency resources to be activated at the same time, the plurality of frequency resources comprises the second frequency resource, wherein the codepoint is one of a plurality of codepoints, each of the plurality of codepoints is used to indicate and mapped to a different combination of frequency resources to be activated at the same time; and
communicate, via an interface, with the wireless communication device, in the second frequency resource.

20. A wireless communication device, comprising:
at least one processor configured to:
switch from communicating with a network in a first frequency resource to communicating with the network in a second frequency resource, comprising receiving, by the wireless communication device from network, first downlink information in the first frequency resource, the first downlink information comprises an indication to a plurality of frequency resources to be activated at a same time, wherein the first downlink information indicates a codepoint corresponding to the plurality of frequency resources to be activated at the same time, the plurality of frequency resources comprises the second frequency resource, wherein the codepoint is one of a plurality of codepoints, each of the plurality of codepoints is used to indicate and mapped to a different combination of frequency resources to be activated at the same time; and
communicate, with the network, in the second frequency resource.

* * * * *